United States Patent
Rossi et al.

(10) Patent No.: US 12,455,851 B1
(45) Date of Patent: Oct. 28, 2025

(54) ADAPTIVE BUFFER SHARING IN MULTI-CORE RECONFIGURABLE STREAMING-BASED ARCHITECTURES

(71) Applicant: STMicroelectronics International N.V., Geneva (CH)

(72) Inventors: Michele Rossi, Bareggio (IT); Thomas Boesch, Rovio (CH); Giuseppe Desoli, San Fermo Della Battaglia (IT)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/906,697

(22) Filed: Oct. 4, 2024

(51) Int. Cl.
  *G06F 15/82* (2006.01)
  *G06F 15/78* (2006.01)
  *G06N 3/063* (2023.01)

(52) U.S. Cl.
  CPC ............. *G06F 15/82* (2013.01); *G06N 3/063* (2013.01)

(58) Field of Classification Search
  CPC ......... G06F 15/17337; G06F 15/17343; G06F 15/781; G06F 15/7825; G06F 15/82; G06N 3/063
  See application file for complete search history.

(56) References Cited

U.S. PATENT DOCUMENTS

| | | | |
|---|---|---|---|
| 8,327,187 B1* | 12/2012 | Metcalf | G06F 12/0855 714/10 |
| 11,119,765 B2* | 9/2021 | Ahmed | G06F 9/3001 |
| 2011/0314255 A1* | 12/2011 | Krishna | G06F 15/17337 712/30 |
| 2019/0303295 A1* | 10/2019 | Steinmacher-Burow | G06F 12/0833 |
| 2020/0004690 A1* | 1/2020 | Mathew | G06F 12/0813 |
| 2021/0097047 A1 | 4/2021 | Billa et al. | |
| 2021/0241806 A1* | 8/2021 | Chawla | G06N 3/063 |
| 2022/0101086 A1 | 3/2022 | Cappetta et al. | |
| 2022/0101108 A1* | 3/2022 | Akopyan | G06N 3/045 |
| 2022/0318609 A1* | 10/2022 | Fick | G06N 3/045 |
| 2023/0058989 A1 | 2/2023 | Hammarlund et al. | |
| 2023/0131698 A1* | 4/2023 | Noguera | G06F 3/061 711/148 |
| 2024/0220777 A1 | 7/2024 | Girardi et al. | |

* cited by examiner

*Primary Examiner* — Jacob Petranek
(74) *Attorney, Agent, or Firm* — Seed IP Law Group LLP

(57) ABSTRACT

A hardware accelerator includes a plurality of functional circuits, a stream switch, and a plurality of neural network processing cores coupled to the plurality of functional circuits via the stream switch to stream data to and from functional circuits of the plurality of functional circuits, wherein the neural network processing cores include at least one sender core having a buffer whose buffer content is sharable with at least one receiver core of the neural network processing cores via at least one of a dedicated output stream link or dedicated virtual channel on a pre-existing output stream link, and wherein the at least one of the dedicated output stream link or dedicated virtual channel is dedicated to sharing the buffer content via the stream switch.

20 Claims, 7 Drawing Sheets

ADAPTIVE BUFFER SHARING IN MULTI-CORE RECONFIGURABLE STREAMING-BASED ARCHITECTURES

BACKGROUND

Technical Field

The present disclosure generally relates to hardware architecture for artificial intelligence (AI) workloads acceleration, and in particular, in the context of stream-based hardware accelerators.

Description of the Related Art

Various computer vision, speech recognition, and signal processing applications may benefit from the use of learning/inference machines, which may quickly perform hundreds, thousands, or even millions of concurrent operations. Learning/inference machines, as discussed in this disclosure, may fall under the technological titles of machine learning, artificial intelligence, neural networks, probabilistic inference engines, accelerators, and the like. Such learning/inference machines may include or otherwise utilize artificial neural networks (ANNs) to, e.g., processes large quantities of data and adaptively "learns" by conflating proximally related features within the data, making broad predictions about the data, and refining the predictions based on reliable conclusions and new conflations. In many cases, a neural network is arranged in a plurality of "layers," and different types of computations are performed at each layer. Hardware accelerators (e.g., neural processing units (NPUs)) are often employed to accelerate the processing of large amounts of data by ANNs.

BRIEF SUMMARY

Memory is typically a bottleneck for neural network processing. An NPU's processing cores are typically equipped with fast and expensive memories of fixed size, yet neural network models can be associated with different constraints between consecutive layers. Therefore, many challenges exist in this context. For example, it can be difficult to reach good hardware utilization for every layer. While multiple processing cores working in parallel can increase throughput, data redundancy in each core's buffer can waste energy and memory usage (e.g., memories can be locked in In-Memory Computing (IMC)-based accelerators).

In view of the above, in some embodiments of the presently disclosed technology, a hardware accelerator includes a plurality of functional circuits; a stream switch; and a plurality of neural network processing cores coupled to the plurality of functional circuits via the stream switch to stream data to and from functional circuits of the plurality of functional circuits, wherein the neural network processing cores include at least one sender core having a buffer whose buffer content is sharable with at least one receiver core of the neural network processing cores via at least one of a dedicated output stream link or dedicated virtual channel on a pre-existing output stream link, and wherein the at least one of the dedicated output stream link or dedicated virtual channel is dedicated to sharing the buffer content via the stream switch.

In some embodiments, a system includes a host device and a hardware accelerator. The hardware accelerator includes: a plurality of functional circuits; a stream switch; and a plurality of neural network processing cores coupled to the plurality of functional circuits via the stream switch to stream data to and from functional circuits of the plurality of functional circuits, wherein the neural network processing cores include at least one sender core having a buffer whose buffer content is sharable with at least one receiver core of the neural network processing cores via at least one of a dedicated output stream link or dedicated virtual channel on a pre-existing output stream link, and wherein the at least one of the dedicated output stream link or dedicated virtual channel is dedicated to sharing the buffer content via the stream switch.

In some embodiments, a method includes streaming data between a plurality of neural network processing cores of a hardware accelerator and a plurality of functional circuits of the hardware accelerator via a stream switch, wherein the neural network processing cores include at least one sender core having a buffer whose buffer content is sharable with at least one receiver core of the neural network processing cores via at least one of a dedicated output stream link or dedicated virtual channel on a pre-existing output stream link, and wherein the at least one of the dedicated output stream link or dedicated virtual channel is dedicated to sharing the buffer content via the stream switch.

BRIEF DESCRIPTION OF THE SEVERAL VIEWS OF THE DRAWINGS

One or more embodiments are described hereinafter with reference to the accompanying drawings.

DETAILED DESCRIPTION

Figure 1:
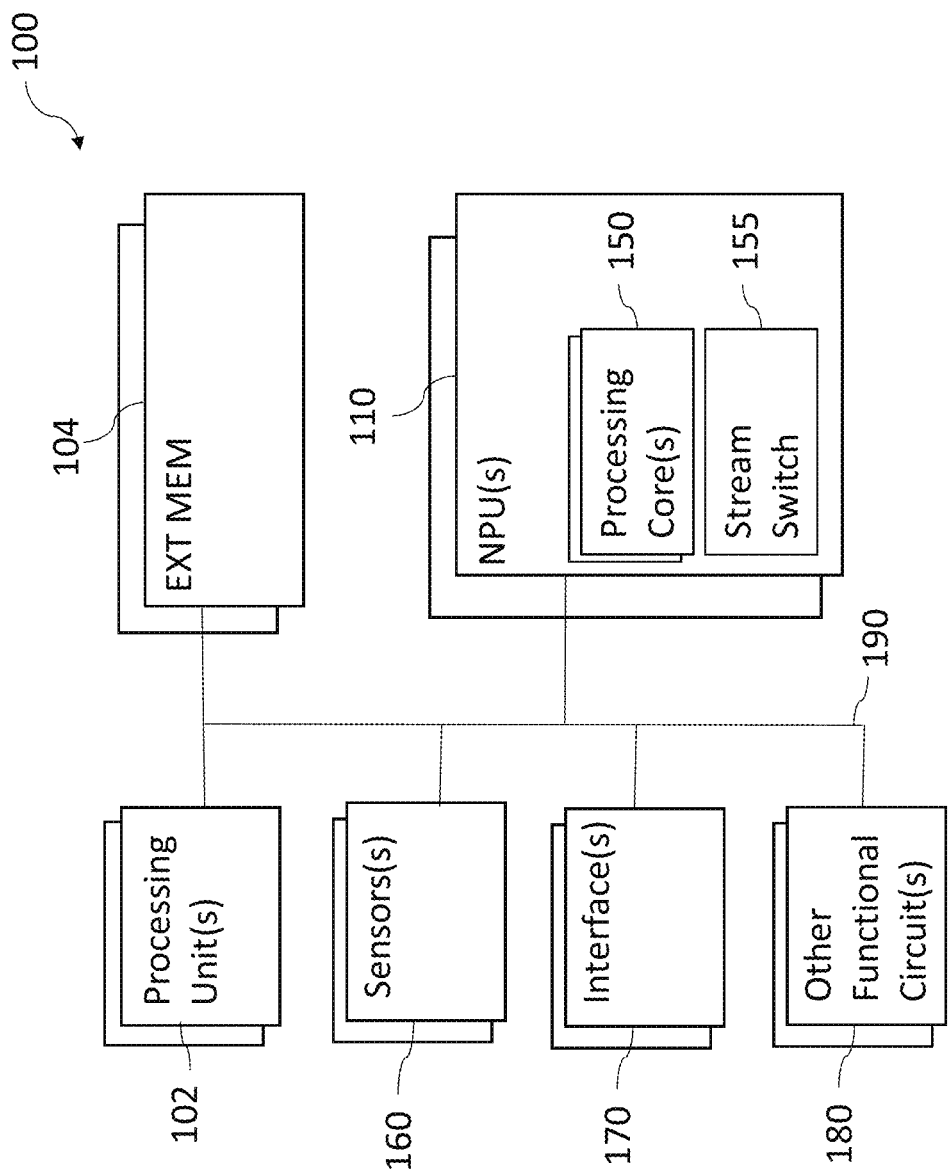
FIG. 1 is a functional block diagram of an embodiment of an electronic device or system of the type to which described embodiments may apply.

The following description, along with the accompanying drawings, sets forth certain specific details in order to provide a thorough understanding of various disclosed embodiments. However, one skilled in the relevant art will recognize that the disclosed embodiments may be practiced in various combinations, with or without one or more of these specific details, or with other methods, components, devices, materials, etc. In other instances, well-known structures or components that are associated with the environment of the present disclosure, including but not limited to interfaces, power supplies, physical component layout, convolutional accelerators, Multiply-ACcumulate (MAC) circuitry, control or configuration registers, bus systems, etc., in a programmable hardware accelerator environment, have not been shown or described in order to avoid unnecessarily obscuring descriptions of the embodiments. Additionally, the various embodiments may be methods, systems, devices, computer program products, etc.

Throughout the specification, claims, and drawings, the following terms take the meaning associated herein, unless the context indicates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context indicates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context indicates otherwise. In addition, throughout the specification, the meaning of "a," "an," and "the" include singular and plural references.

Typically, NPUs are equipped with fixed-function processing cores to accelerate basic neural network nodes, such as convolutional layers or pooling layers. Memory footprint and bandwidth are typical bottlenecks for neural processing, so efficient NPU architectures rely heavily on data reuse, which is usually obtained with a hierarchical organization of memories, using cheap and slow external memories with good storage density to save input/output data and fast but expensive on-chip memories to save and reuse intermediate data. Thus, the NPU processing cores are often equipped with relatively small buffers (e.g., implemented with memories, flip-flops or other technologies) to store and reuse data as often as possible. However, neural network architectures can be very complex and any two layers in a neural network model can show very different requirements in terms of memory footprint, raw computing power, throughput, or the like. Thus, it is challenging to achieve satisfactory hardware efficiency for every layer of the model.

An NPU can be equipped with multiple instances of the same processing core, and these cores can be used in parallel to increase the throughput. When multiple cores need to process the same input data, a copy of these data is typically loaded into each of their buffers. However, copying the same data on two or more different memories is a redundant operation and wastes energy as well as storage space. Additionally, in a processing core where such buffers are implemented by IMC devices, and the devices are also used as processing elements. In these cases, IMCs that redundantly store the copies of input data cannot be used as processing elements (e.g., to implement functional computing) to increase throughput.

Embodiments of the presently disclosed technology provide a flexible architecture based on concurrent operation of multiple processing cores where the cores are equipped with buffers whose content can be shared with other cores. The content of a buffer can be shared either by adding a dedicated output stream link with access to the buffer, or by adding a dedicated virtual channel on a pre-existing output stream link. In both cases, an associated controller of negligible area can be used. If two or more different types of processing cores are involved, the buffer access patterns of the core programmed to share the content of its buffer are compatible with those of the receiver core(s). Both sender and receiver cores can be programmed with dedicated configuration registers. Each individual processing core can be specified at design-time to be equipped (or not) with other additional hardware to implement various embodiments. In some embodiments, the presently disclosed technology is implemented on IMC-based processing cores or systems.

The presently disclosed technology, when implemented, can avoid power losses due to redundant data copies while maintaining the same throughput at negligible area cost, can increase processing throughput (e.g., employing IMCs as processing elements when they would otherwise be locked as buffers), can add a degree of freedom at design-time for design space exploration and hardware-software co-design optimization, and can add a degree of freedom for optimal mapping space exploration performed offline by a compiler/mapping tool.

FIG. 1 is a functional block diagram of an embodiment of an electronic device or system 100 of the type to which described embodiments may apply. The system 100 comprises one or more processing units or circuits 102. The processing units 102 may comprise, for example, one or more processors, a state machine, a microprocessor, a programmable logic circuit, discrete circuitry, logic gates, registers, etc., and various combinations thereof. The processing units may control overall operation of the system 100, execution of application programs by the system 100 (e.g., programs which classify images using convolutional neural networks (CNNs)), etc.

The system 100 includes one or more external memories 104, such as one or more volatile and/or non-volatile memories which may store, for example, all or part of instructions and data related to control of the system 100, applications and operations performed by the system 100, etc. One or more of the external memories 104 may include a memory array, which, in operation, may be shared by one or more processes executed by the system 100.

The system 100 can include one or more sensors 160 (e.g., image sensors, audio sensors, accelerometers, pressure sensors, temperature sensors, etc.), one or more interfaces 170 (e.g., wireless communication interfaces, wired communication interfaces, etc.), and other circuits 180, which can include antennas, power supplies, one or more built-in self-test (BIST) circuits, etc., and a main bus system 190. The main bus system 190 can include one or more data, address, power and/or control buses coupled to the various components of the system 100.

The system 100 also includes one or more NPUs 110 (or other applicable hardware accelerators) which, in operation, accelerate the performance of one or more neural network operations, e.g., associated with implementing a CNN. The NPU 110 as illustrated includes one or more functional circuitry (e.g., convolutional accelerator, pooling layer module, activation unit, direct memory access (DMA) unit, etc.), which can include processing core(s) 150. The hardware accelerator 110 also includes a stream switch 155 or other interconnect, and in some embodiments, other processing cores 150. In some embodiments, the stream switch 155 uses a protocol that is shared between all components or circuitry connected to the stream switch 155.

Figure 2A:
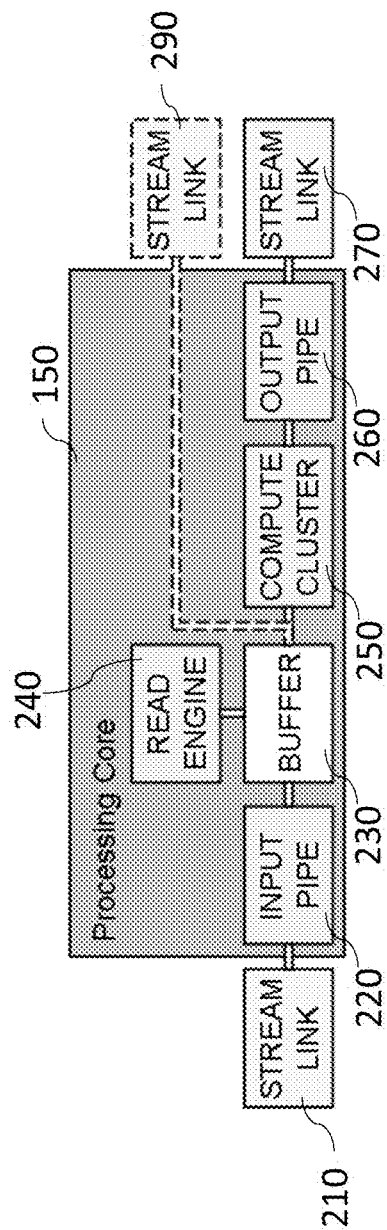
FIGS. 2A-2C are block diagrams illustrating the integration of adaptive buffer sharing between processing cores of an NPU, in accordance with some embodiments.
Figure 2B:
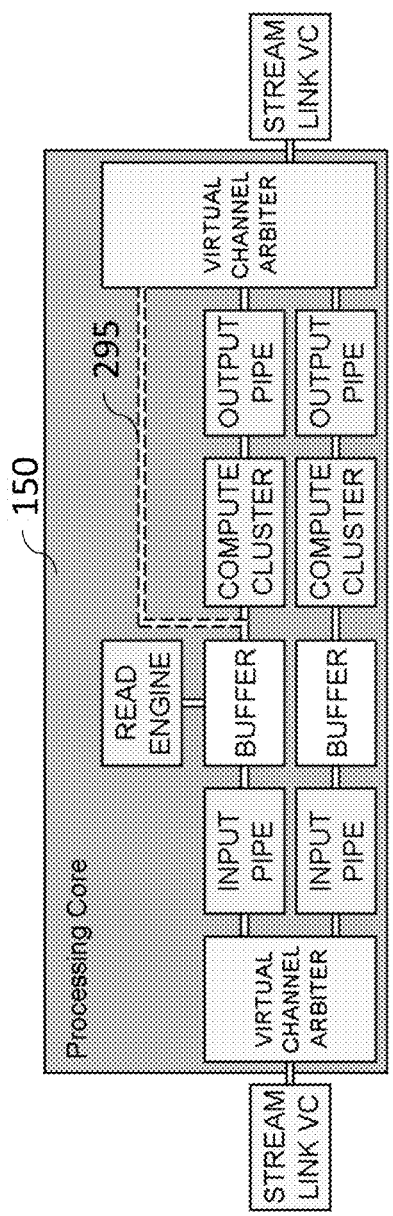
Figure 2C:
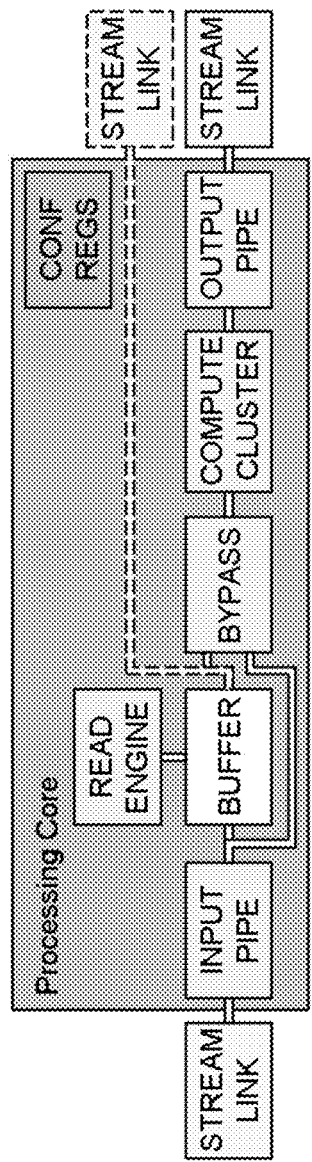

FIGS. 2A-2C are block diagrams illustrating the integration of adaptive buffer sharing between processing cores of an NPU 110, in accordance with some embodiments. As shown in FIG. 2A, typically, a stream-based processing core 150 includes an input pre-processing pipeline 220, a buffer 230 that can store input data, a read engine 240 that can perform access pattern(s) to access the buffer, a compute cluster 250 of processing elements that can implement the arithmetical or logical operation of the processing core, and an output post-processing pipeline 260. The processing core 150 is connected to the interconnection network (e.g., the stream switch 155 of the NPU 110) through at least one input stream link 210 and at least one output stream link 270.

In many cases, the buffer 230 can store more data than what the compute cluster 250 can manage per round of operation, and the read engine 240 only extracts a subset of the stored input data which is compatible with the capacity of the compute cluster 250 according to corresponding access pattern(s). The pattern can be fixed, programmable at run-time (e.g., through dedicated configuration registers), instruction-based (e.g., microcode stored on a register file), or the like, depending on the read engine implementation.

In accordance with some embodiments of the presently disclosed technology, the processing core 150 (e.g., as a sender core) is improved with the addition of a dedicated stream link 290 directly connected to the buffer 230 (via dashed line as shown) and outputting buffered data to the interconnection network (e.g., the stream switch 155 of the NPU 110).

FIG. 2B shows an example variation of the stream-based processing core 150. Compared with the processing core architecture of FIG. 2A, here the processing core 150 has virtual channel support. Illustratively, instead of transferring data directly via input and output stream links, the processing core 150 is connected to the interconnection network (e.g., the stream switch 155 of the NPU 110) through input and output stream link virtual channel(s) (e.g., via associated input and output virtual channel arbiters).

In accordance with some embodiments of the presently disclosed technology, the processing core 150 (e.g., as a sender core) is improved with the addition of a dedicated virtual channel 295 with direct connection to a corresponding buffer and outputting buffered data to the interconnection network (e.g., the stream switch 155 of the NPU 110) via associated output virtual channel arbiter.

As shown in FIG. 2C, when a processing core 150 is programmed to receive data from a different core (e.g., a sender core), it can be referred to as a receiver core. In various embodiments, the receiver core avoids storing data in its buffer. A bypass circuit can be implemented to route the output of the pre-processing pipeline directly to the compute cluster of processing elements.

In various embodiments, the bypass circuit and the additional stream link can be programmed by dedicated configuration register to select the mode of operation for a processing core. At run-time within an NPU, at least one processing core in "sender" mode can be connected, e.g., via the stream switch, to at least one processing core in "receiver" mode. A processing core which is programmed in "receiver" mode can disable its read engine and buffer, thus avoiding the relative power losses.

In some embodiments, a designer can choose at design-time to instantiate at least one processing core with a buffer (and corresponding read engine) equipped, and one or more cores without buffer (and corresponding read engine). If the processing core supports virtual channels, the decision to equip or not equip the buffer (and corresponding read engine) can be made per each independent processing pipeline in the core.

Figure 3:
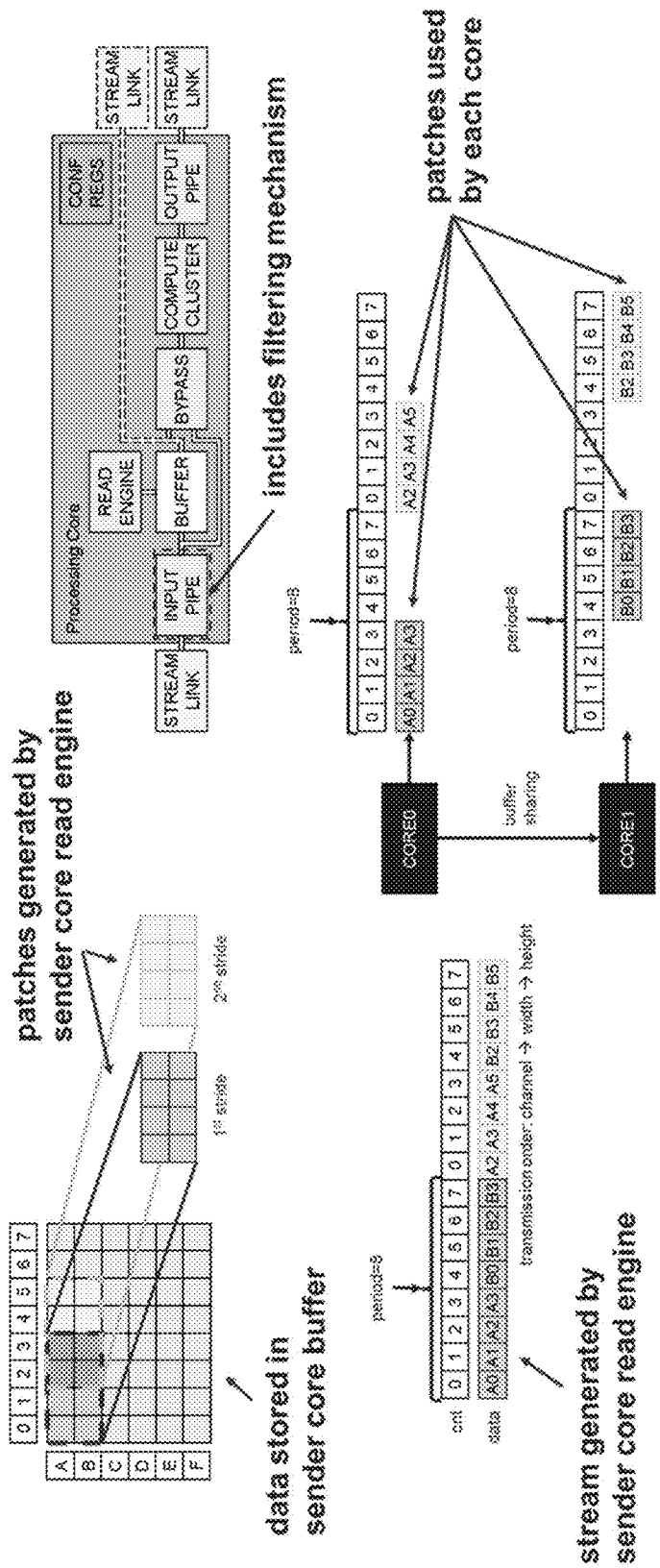
FIG. 3 shows an example of read engine implementation in accordance with some embodiments.

FIG. 3 shows an example of read engine implementation in accordance with some embodiments. Illustratively, the read engine is associated with filtering circuit that is included in the pre-processing pipeline of a processing core programmed in "receiver" mode.

In some embodiments, dataflow between sender and receiver processing cores is managed using backpressure signals (e.g., stall signals) generated by each receiver core. Dedicated configuration registers can be programmed to determine, for each receiver core, which is the first and last element of a periodic string of data elements as valid for that core and accepted from the sender core. Cores which have received all the expected data elements will not stall the broadcast network, whereas any single stalling core which did not receive all of its expected elements can stall the entire broadcast.

In some embodiments, a more complex implementation to manage dataflow, where elements that a core expects to receive can be non-contiguous (e.g., 2D or even 3D tensor shapes), can use multiple loops implemented with nested counters, each with its first, last, and period values along a determined axis. In some embodiments, a programmable tag engine can support the broadcasting to reach a custom degree of addressability of each core. The final implementation can be a design-time choice for APT trade-off.

In some embodiments, the read engine access pattern(s) of a processing core programmed as sender must be compatible with that of processing core(s) programmed as receiver(s). However, the sender and the receiver cores may or may not be of the same type (i.e., performing the same arithmetical or logical operations). The adaptive buffer sharing between processing cores can function as long as the sender and receiver cores share compatible read engine access patterns.

Figure 4:
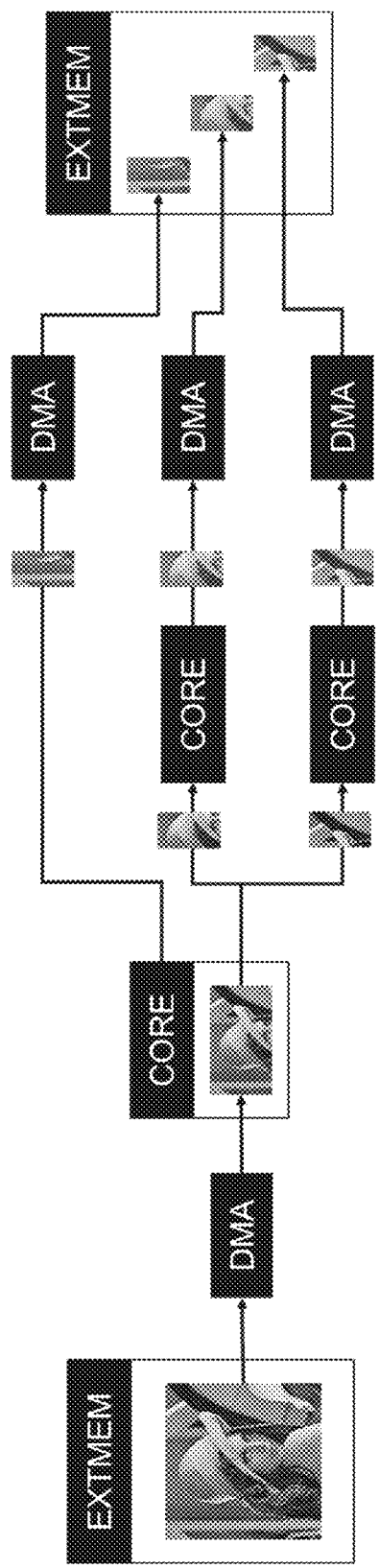
FIG. 4 shows an example of a processing chain implementing some embodiments of the presently disclosed technology.

FIG. 4 shows an example of a processing chain implementing some embodiments of the presently disclosed technology. As shown, in accordance with the processing chain, input DMA fetches a portion of an image data from external memory to the buffer of a first processing core. The first core generates and distributes patches of its buffered data to two other cores. All three cores generate output data starting from the patches received (the first core has direct access to the buffered data). Output DMAs save the processing cores' output into the external memory, eventually at different addresses.

Figure 5:
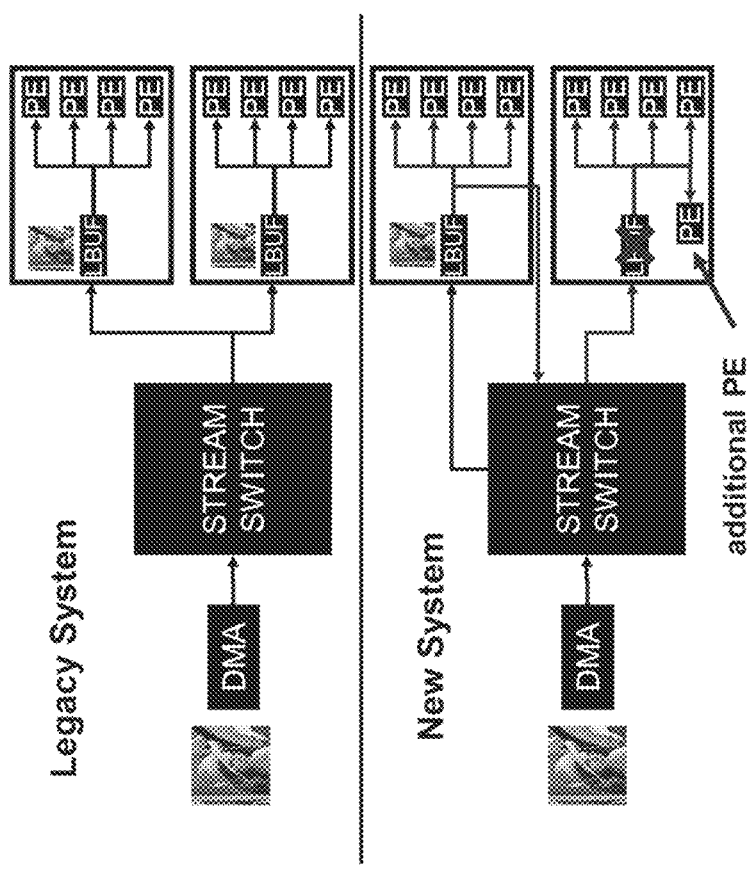
FIG. 5 shows an example IMC-based processing core integrating some embodiments of the presently disclosed technology.

FIG. 5 shows an example IMC-based processing core integrating some embodiments of the presently disclosed technology. IMC-based cores can use IMCs as buffer at run-time, switching them between memory and compute mode through dedicated configuration registers. As shown in FIG. 5, a typical legacy system has at least one IMC device locked as line buffer (LBUF) in each processing core, while remaining IMC tiles in each core are in compute mode. In comparison, a new system according to some embodiments of the presently disclosed technology includes at least one IMC device locked in a first core to serve as its LBUF, while remaining IMC tiles are in compute mode; all IMC tiles of other core(s) are in compute mode. Accordingly, the new system avoids redundant copies of input data. No need to buffer redundant data enables IMCs previously locked as buffer to be repurposed as additional compute elements to increase throughput and reduce total processing time.

In some embodiments, a hardware accelerator includes a plurality of functional circuits; a stream switch; and a plurality of neural network processing cores coupled to the plurality of functional circuits via the stream switch to stream data to and from functional circuits of the plurality of functional circuits, wherein the neural network processing cores include at least one sender core having a buffer whose buffer content is sharable with at least one receiver core of the neural network processing cores via at least one of a dedicated output stream link or dedicated virtual channel on a pre-existing output stream link, and wherein the at least one of the dedicated output stream link or dedicated virtual channel is dedicated to sharing the buffer content via the stream switch.

In some embodiments, buffer access patterns of the at least one sender core are compatible with buffer access patterns of the at least one receiver core.

In some embodiments, the at least one sender core and the at least one receiver core are programmed with dedicated configuration registers to configure the sharing of the buffer content.

In some embodiments, the at least one sender core and the at least one receiver core are implemented with In-Memory Computing (IMC) devices. In some embodiments, the at least one sender core has at least one IMC device as the buffer locked in memory mode and has other IMC devices operating in compute mode. In some embodiments, the at least one receiver core has all IMC devices operating in compute mode.

In some embodiments, the at least one sender core uses a first subset of the buffer content for computation and the at least one receiver core uses a second subset of the buffer content for computation.

In some embodiments, the hardware accelerator is a neural processing unit (NPU).

In some embodiments, a system includes a host device and a hardware accelerator. The hardware accelerator includes: a plurality of functional circuits; a stream switch; and a plurality of neural network processing cores coupled to the plurality of functional circuits via the stream switch to stream data to and from functional circuits of the plurality of functional circuits, wherein the neural network processing cores include at least one sender core having a buffer whose buffer content is sharable with at least one receiver core of the neural network processing cores via at least one of a dedicated output stream link or dedicated virtual channel on a pre-existing output stream link, and wherein the at least one of the dedicated output stream link or dedicated virtual channel is dedicated to sharing the buffer content via the stream switch.

In some embodiments, buffer access patterns of the at least one sender core are compatible with buffer access patterns of the at least one receiver core.

In some embodiments, the at least one sender core and the at least one receiver core are programmed with dedicated configuration registers to configure the sharing of the buffer content.

In some embodiments, the at least one sender core and the at least one receiver core are implemented with In-Memory Computing (IMC) devices. In some embodiments, the at least one sender core has at least one IMC device as the buffer locked in memory mode and has other IMC devices operating in compute mode. In some embodiments, the at least one receiver core has all IMC devices operating in compute mode.

In some embodiments, the at least one sender core uses a first subset of the buffer content for computation and the at least one receiver core uses a second subset of the buffer content for computation.

In some embodiments, the hardware accelerator is a neural processing unit (NPU).

In some embodiments, a method includes streaming data between a plurality of neural network processing cores of a hardware accelerator and a plurality of functional circuits of the hardware accelerator via a stream switch, wherein the neural network processing cores include at least one sender core having a buffer whose buffer content is sharable with at least one receiver core of the neural network processing cores via at least one of a dedicated output stream link or dedicated virtual channel on a pre-existing output stream link, and wherein the at least one of the dedicated output stream link or dedicated virtual channel is dedicated to sharing the buffer content via the stream switch.

In some embodiments, buffer access patterns of the at least one sender core are compatible with buffer access patterns of the at least one receiver core.

In some embodiments, the at least one sender core and the at least one receiver core are programmed with dedicated configuration registers to configure the sharing of the buffer content.

In some embodiments, the at least one sender core uses a first subset of the buffer content for computation and the at least one receiver core uses a second subset of the buffer content for computation.

Some embodiments may take the form of or comprise computer program products. For example, according to one embodiment there is provided a computer readable medium comprising a computer program or other computer-executable instructions adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A hardware accelerator, comprising:
a plurality of functional circuits;
a stream switch; and
a plurality of neural network processing cores coupled to the plurality of functional circuits via the stream switch to stream data to and from functional circuits of the plurality of functional circuits, wherein the neural network processing cores include at least one sender core having a buffer whose buffer content is sharable with at least one receiver core of the neural network processing cores via at least one of a dedicated output stream link or dedicated virtual channel on a pre-existing output stream link, and wherein the at least one of the dedicated output stream link or dedicated virtual channel is dedicated to sharing the buffer content via the stream switch.

2. The hardware accelerator of claim 1, wherein buffer access patterns of the at least one sender core are compatible with buffer access patterns of the at least one receiver core.

3. The hardware accelerator of claim 1, wherein the at least one sender core and the at least one receiver core are programmed with dedicated configuration registers to configure the sharing of the buffer content.

4. The hardware accelerator of claim 1, wherein the at least one sender core and the at least one receiver core are implemented with In-Memory Computing (IMC) devices.

5. The hardware accelerator of claim 4, wherein the at least one sender core has at least one IMC device as the buffer locked in memory mode and has other IMC devices operating in compute mode.

6. The hardware accelerator of claim 4, wherein the at least one receiver core has all IMC devices operating in compute mode.

7. The hardware accelerator of claim 1, wherein the at least one sender core uses a first subset of the buffer content for computation and the at least one receiver core uses a second subset of the buffer content for computation.

8. The hardware accelerator of claim 1, wherein the hardware accelerator is a neural processing unit (NPU).

9. A system, comprising:
a host device; and
a hardware accelerator, the hardware accelerator including:
a plurality of functional circuits;
a stream switch; and
a plurality of neural network processing cores coupled to the plurality of functional circuits via the stream switch to stream data to and from functional circuits of the plurality of functional circuits, wherein the neural network processing cores include at least one sender core having a buffer whose buffer content is sharable with at least one receiver core of the neural network processing cores via at least one of a dedicated output stream link or dedicated virtual channel on a pre-existing output stream link, and wherein the at least one of the dedicated output stream link or dedicated virtual channel is dedicated to sharing the buffer content via the stream switch.

10. The system of claim 9, wherein buffer access patterns of the at least one sender core are compatible with buffer access patterns of the at least one receiver core.

11. The system of claim 9, wherein the at least one sender core and the at least one receiver core are programmed with dedicated configuration registers to configure the sharing of the buffer content.

12. The system of claim 9, wherein the at least one sender core and the at least one receiver core are implemented with In-Memory Computing (IMC) devices.

13. The system of claim 12, wherein the at least one sender core has at least one IMC device as the buffer locked in memory mode and has other IMC devices operating in compute mode.

14. The system of claim 12, wherein the at least one receiver core has all IMC devices operating in compute mode.

15. The system of claim 9, wherein the at least one sender core uses a first subset of the buffer content for computation and the at least one receiver core uses a second subset of the buffer content for computation.

16. The system of claim 9, wherein the hardware accelerator is a neural processing unit (NPU).

17. A method, comprising:
streaming data between a plurality of neural network processing cores of a hardware accelerator and a plurality of functional circuits of the hardware accelerator via a stream switch,
wherein the neural network processing cores include at least one sender core having a buffer whose buffer content is sharable with at least one receiver core of the neural network processing cores via at least one of a dedicated output stream link or dedicated virtual channel on a pre-existing output stream link, and wherein the at least one of the dedicated output stream link or dedicated virtual channel is dedicated to sharing the buffer content via the stream switch.

18. The method of claim 17, wherein buffer access patterns of the at least one sender core are compatible with buffer access patterns of the at least one receiver core.

19. The method of claim 17, wherein the at least one sender core and the at least one receiver core are programmed with dedicated configuration registers to configure the sharing of the buffer content.

20. The method of claim 17, wherein the at least one sender core uses a first subset of the buffer content for computation and the at least one receiver core uses a second subset of the buffer content for computation.

* * * * *